(12) United States Patent
Ross

(10) Patent No.: US 12,086,564 B2
(45) Date of Patent: Sep. 10, 2024

(54) SYSTEM AND METHOD FOR VOICE MORPHING IN A DATA ANNOTATOR TOOL

(71) Applicant: SoundHound, Inc., Santa Clara, CA (US)

(72) Inventor: Dylan H. Ross, Los Angeles, CA (US)

(73) Assignee: SoundHound AI IP, LLC., Santa Clara, CA (US)

( * ) Notice: Subject to any disclaimer, the term of this patent is extended or adjusted under 35 U.S.C. 154(b) by 0 days.

(21) Appl. No.: 17/539,182

(22) Filed: Nov. 30, 2021

(65) Prior Publication Data

US 2022/0092273 A1 Mar. 24, 2022

Related U.S. Application Data

(62) Division of application No. 16/578,386, filed on Sep. 22, 2019, now Pat. No. 11,205,056.

(51) Int. Cl.
*G10L 15/18* (2013.01)
*G06F 40/56* (2020.01)
(Continued)

(52) U.S. Cl.
CPC .............. *G06F 40/56* (2020.01); *G06F 40/58* (2020.01); *G10L 15/06* (2013.01); *G10L 15/18* (2013.01); *G10L 19/125* (2013.01); *G10L 19/265* (2013.01); *G10L 21/013* (2013.01); *G10L 2021/0135* (2013.01)

(58) Field of Classification Search
None
See application file for complete search history.

(56) References Cited

U.S. PATENT DOCUMENTS 5,749,073 A * 5/1998 Slaney .................. G10K 15/00
704/265
5,933,808 A 8/1999 Kang et al.
(Continued)

FOREIGN PATENT DOCUMENTS

EP 3839947 A1 6/2021

OTHER PUBLICATIONS

Qian et al. "VoiceMask: Anonymize and Sanitize Voice Input on Mobile Devices". arXiv:1711.11460v1 [cs.CR] Nov. 30, 2017 (Year: 2017).*
(Continued)

*Primary Examiner* — Jesse S Pullias
(74) *Attorney, Agent, or Firm* — Platinum Intellectual Property PC

(57) ABSTRACT

A system and method for masking an identity of a speaker of natural language speech, such as speech clips to be labeled by humans in a system generating voice transcriptions for training an automatic speech recognition model. The natural language speech is morphed prior to being presented to the human for labeling. In one embodiment, morphing comprises pitch shifting the speech randomly either up or down, then frequency shifting the speech, then pitch shifting the speech in a direction opposite the first pitch shift. Labeling the morphed speech comprises at least one or more of transcribing the morphed speech, identifying a gender of the speaker, identifying an accent of the speaker, and identifying a noise type of the morphed speech.

17 Claims, 12 Drawing Sheets

(51) Int. Cl.
  *G06F 40/58* (2020.01)
  *G10L 15/06* (2013.01)
  *G10L 19/125* (2013.01)
  *G10L 19/26* (2013.01)
  *G10L 21/013* (2013.01)

(56) References Cited

U.S. PATENT DOCUMENTS

| | | | |
|---|---|---|---|
| 6,519,558 B1 | 2/2003 | Tsutsui | |
| 7,412,383 B1* | 8/2008 | Alonso | H04M 3/4936 |
| | | | 704/E15.021 |
| 8,170,878 B2* | 5/2012 | Liu | G10L 13/033 |
| | | | 704/235 |
| 8,543,402 B1* | 9/2013 | Ma | G10L 17/08 |
| | | | 704/256.4 |
| 8,630,860 B1* | 1/2014 | Zhang | G06F 16/9535 |
| | | | 707/723 |
| 9,984,700 B2* | 5/2018 | Cohen | G10L 21/013 |
| 10,236,006 B1 | 3/2019 | Gurijala et al. | |
| 2003/0110026 A1 | 6/2003 | Yamamoto | |
| 2004/0064317 A1* | 4/2004 | Othmer | H04L 67/306 |
| | | | 704/E15.047 |
| 2008/0147413 A1* | 6/2008 | Sobol-Shikler | G10L 21/003 |
| | | | 704/278 |
| 2009/0089063 A1 | 4/2009 | Meng et al. | |
| 2010/0082338 A1 | 4/2010 | Togawa et al. | |
| 2011/0087491 A1* | 4/2011 | Wittenstein | G10L 15/26 |
| | | | 704/235 |
| 2013/0019738 A1* | 1/2013 | Haupt | G10L 21/013 |
| | | | 84/622 |
| 2016/0336023 A1* | 11/2016 | Guyott | H03G 3/02 |
| 2020/0143820 A1* | 5/2020 | Donofrio | H04R 1/406 |
| 2021/0217431 A1 | 7/2021 | Pearson | |
| 2022/0068257 A1 | 3/2022 | Biadsy et al. | |
| 2022/0068259 A1 | 3/2022 | Pan et al. | |

OTHER PUBLICATIONS

Ching-Hsiang Ho et al., "Formant Model Estimation and Transformation for Voice Morphing," Seventh International Conference on Spoken Language Processing, 2002 (4 pages).

Fahimeh Bahmaninezhad et al., "Convolutional Neural Network Based Speaker De-Identification," Odyssey 2018, The Speaker and Language Recognition Workshop, Jun. 26-29, Les Sables d'Olonne, France (6 pages).

Fuming Fang, High-Quality Nonparallel Voice Conversion Based on Cycle-Consistent Adversarial Network, Apr. 2, 2018, National Institute of Informatics, Japan 2University of Edinburgh, UK, (5 pages).

Gao et al. "Pitch Modification based on Syllable Units for Voice Morphing System". 2007 IFIP International Conference on Network and Parallel Computing Workshops, 2007, pp. 135-139 (Year: 2007).

Mohamed Abou-Zleikha et al., "A Discriminative Approach For Speaker Selection In Speaker De-Identification Systems," 23rd European Signal Processing Conference (EUSIPCO), IEEE No. 978-0-9928626-3-3/15, 2015 (5 pages).

Qin Jin et al., "Speaker De-identification via Voice Transformation," Language Technologies Institute, Carnegie Mellon University, Pittsburgh, PA 15213, IEEE No. 978-1-4244-5479, IEEE workshop on Automatic Speech Recognition and Understanding (ASRU), 2009 (5 pages).

Sajedur Rahman, "Pitch Shifting of Voices in Real-time," University of Victoria, 02-35163. Computer Engineering, Jan. 4, 2008 (45 pages).

* cited by examiner

Original

Pitch shifted up

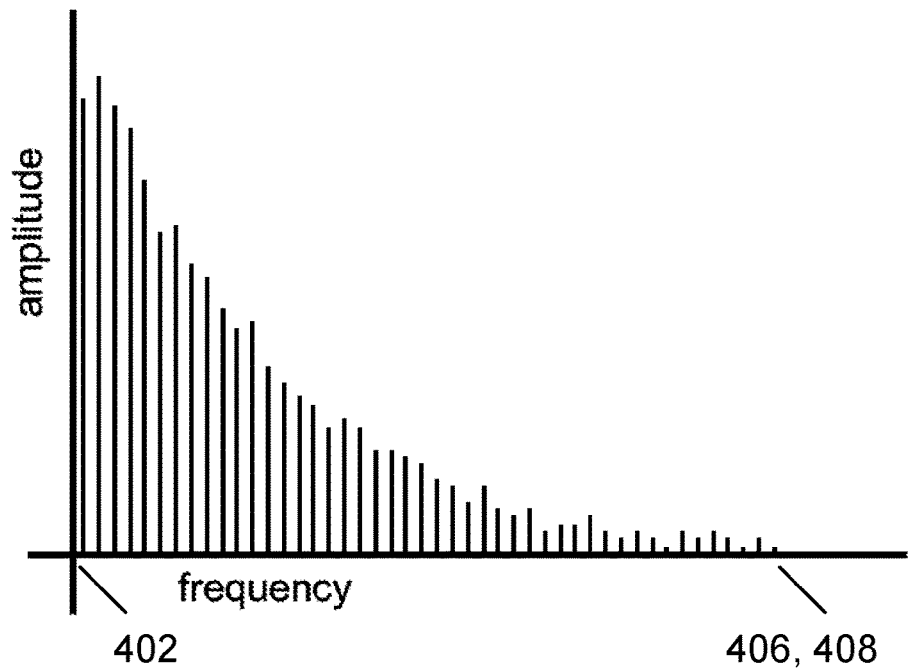
Figure 4(c) Original
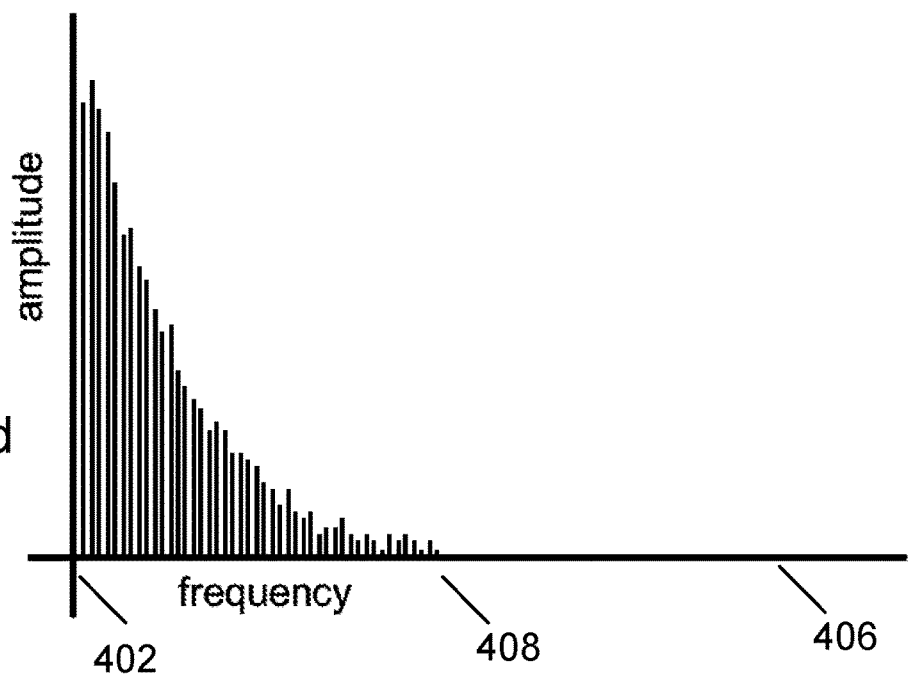
Figure 4(d) Pitch shifted Down

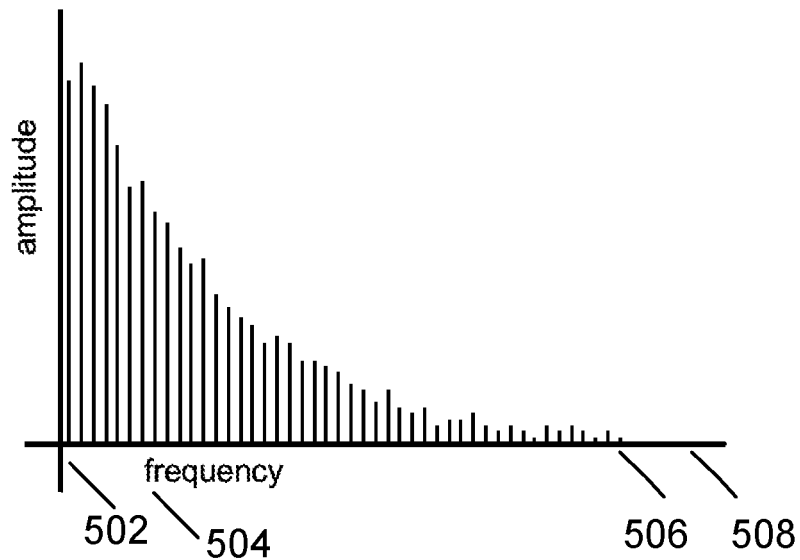
Figure 5(a) Unshifted
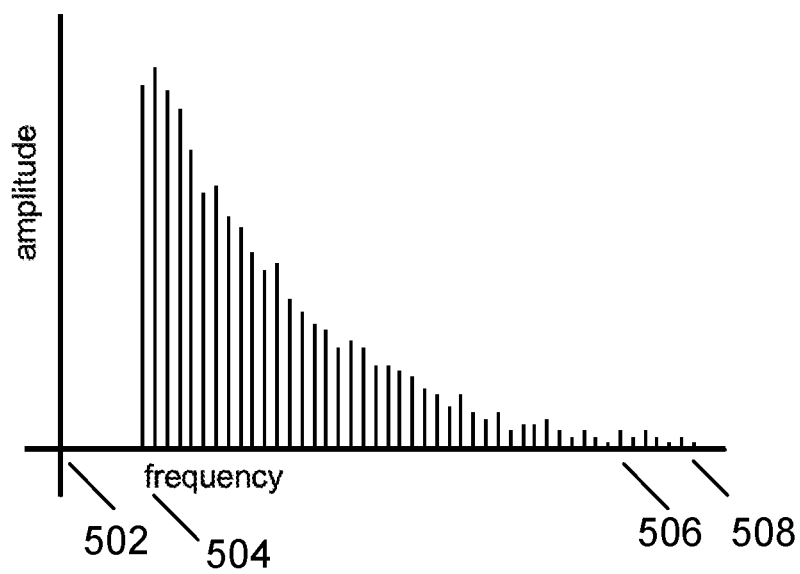
Figure 5(b) Frequency shifted up

SYSTEM AND METHOD FOR VOICE MORPHING IN A DATA ANNOTATOR TOOL

CROSS-REFERENCE TO RELATED APPLICATIONS

This application is a divisional of application Ser. No. 16/578,386, filed Sep. 22, 2019, which is hereby incorporated by reference in its entirety.

FIELD

The present invention relates to speech recognition and, more specifically, to masking the identity of a speaker in a natural language transcription system.

BACKGROUND

Automatic speech recognition (ASR) often employs neural networks (and/or machine learning techniques). Such networks must be trained on samples of speech audio with transcriptions checked by humans. Supervised machine learning requires labeled data. Checking transcriptions is part of labeling data for training automatic speech recognition using machine learning. Labeling data has a fairly low skill requirement and can be done at any time of day. As a result, it is a perfect task for people who work remotely. Many times, this transcription is done by part-time employees or non-employee contractors, who listen to and transcribe recordings of human speech. Other times, humans check and confirm machine generated transcriptions of speech.

Recently, privacy has become increasingly important to many users of speech recognition systems. Some users do not want to be identifiable by voice to unknown people in unknown places. Once a user is identified by voice, one risk is that a transcription worker will be able to use multiple audio clips from the same speaker to discover information about the speaker.

Conventional systems exist to transform the sound of voices in recordings such that it would be difficult to identify a speaker from the transformed audio. Unfortunately, such conventional systems tend to reduce the intelligibility of the transformed speech to a degree that the speech becomes more difficult to understand and transcribe.

Many audio recordings of users of speech recognition systems are surprisingly difficult to understand. Many users speak far from their microphone, their environments have reverberation, constant noise, transient noise, and background speech and music. Users might also have accents and speak in unusual ways. Many audio recordings are difficult to understand, even without transformation.

Moreover, conventional voice transforms, if applied at a strength sufficient to mask the identity of a speaker also reduce intelligibility of many recordings such that the average labeling accuracy decreases by an unacceptable amount.

BRIEF DESCRIPTION OF THE FIGURES

The present invention is illustrated by way of example, and not by way of limitation, in the figures of the accompanying drawings and in which like reference numerals refer to similar elements and in which:

FIGS. 4(c) and 4(d) show an example of pitch shifting down.

FIGS. 5(a) and 5(b) shows an example of frequency shifting.

DETAILED DESCRIPTION

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be used and that logical, mechanical, electrical, functional and other changes may be made without departing from the scope of the present invention. The following detailed description is, therefore, not to be taken in a limiting sense, and the scope of the present invention is defined only by the appended claims.

Figure 1A:
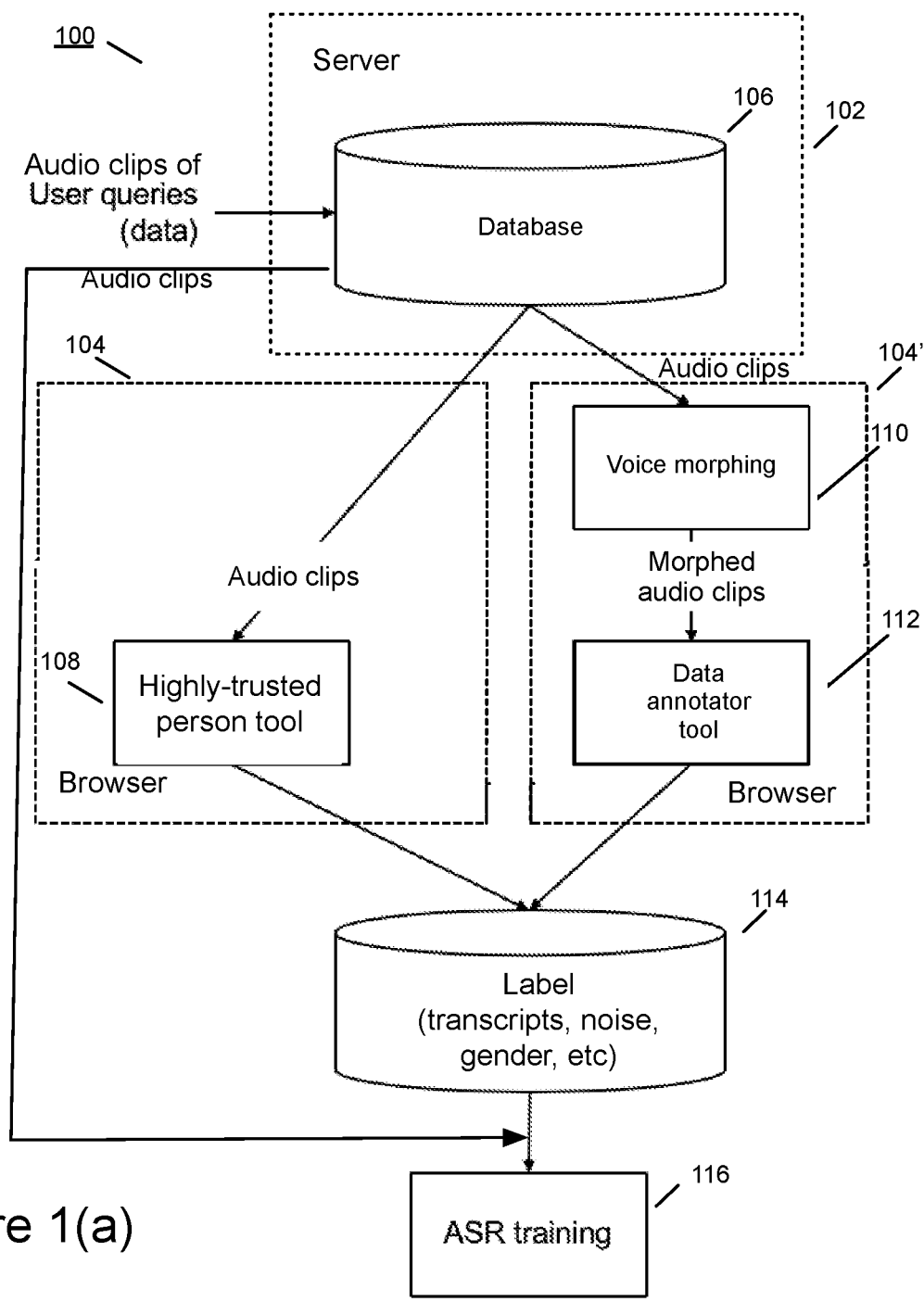
FIG. 1(a) is a block diagram showing a system in which an embodiment of the described invention is used.

FIG. 1(a) is a block diagram showing a system 100 in which an embodiment of the described invention is used. In FIG. 1(a), system 100 comprises at least one server 102, browsers 104, 104', a database 114 containing the outputs of a transcription process of a data annotator tool 112, and software 116 to perform ASR training for a model such as a neural network using the output of the transcription process. In one embodiment, the original audio clip is sent for training. In this embodiment, only the morphed clip is used for labeling.

In FIG. 1(a), audio clips of user queries and control statements are captured from, for example, a home automation device, query device, car automation device, dictation system, etc. This data is stored in a database 106 of server 102. In some embodiments, there may be more than one server 102 and the data may be stored across multiple servers. Audio compression is possible such as to minimize network bandwidth usage or, for large databases, minimize data storage or maximize access speed or search speed. However, it is typically desirable to have little or no compression loss. Any loss gives up information that might, for some audio segments, allow data labelers to be more accurate in labeling. For that purpose, raw audio, WAV files, and Free Lossless Audio Compression (FLAC) are examples of appropriate storage codecs and formats, although any appropriate audio codec can be used.

Figure 6A:
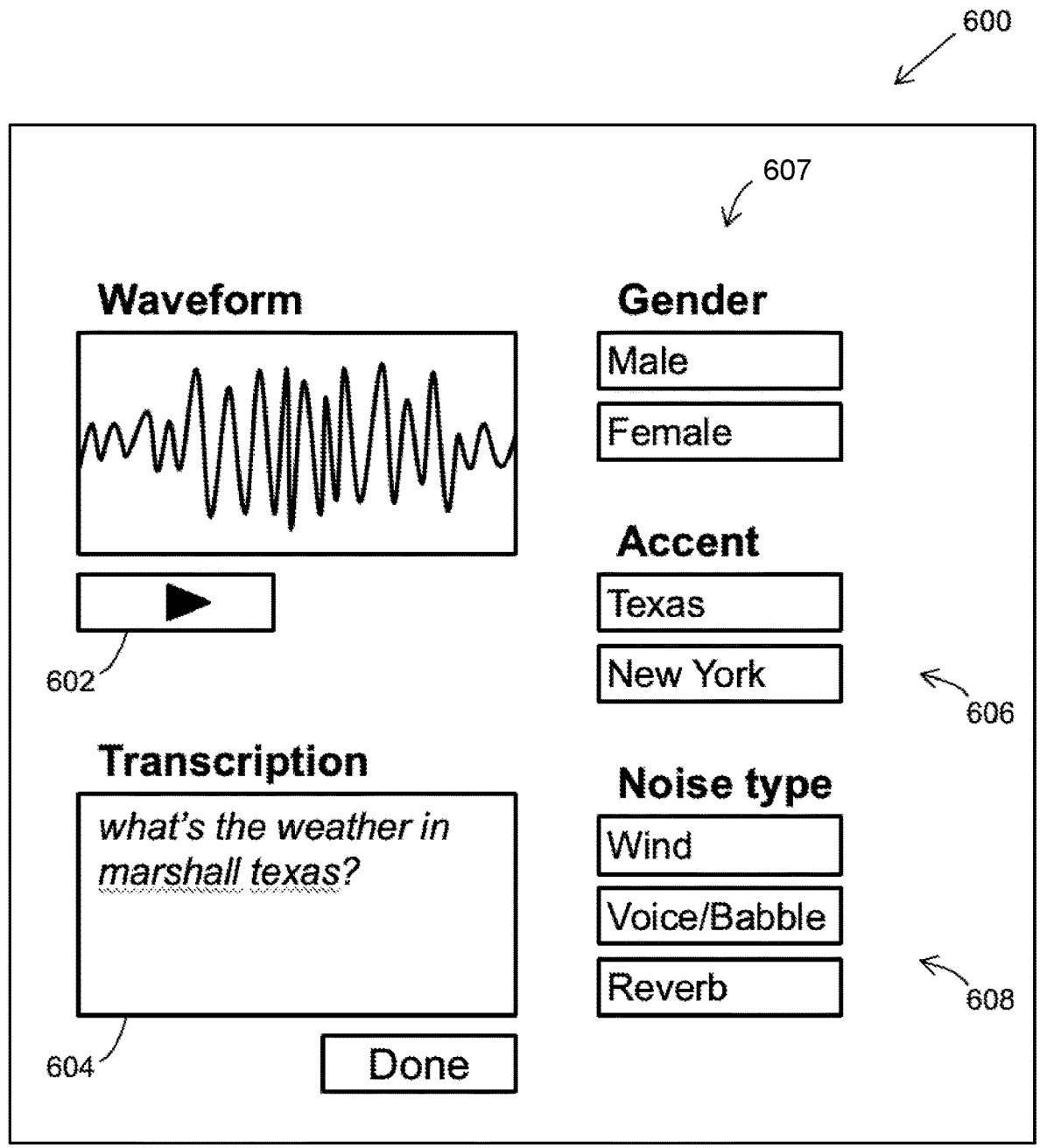
FIG. 6(a) shows an example of a UI for a data annotator tool in accordance with an embodiment of the described invention.
Figure 6B:
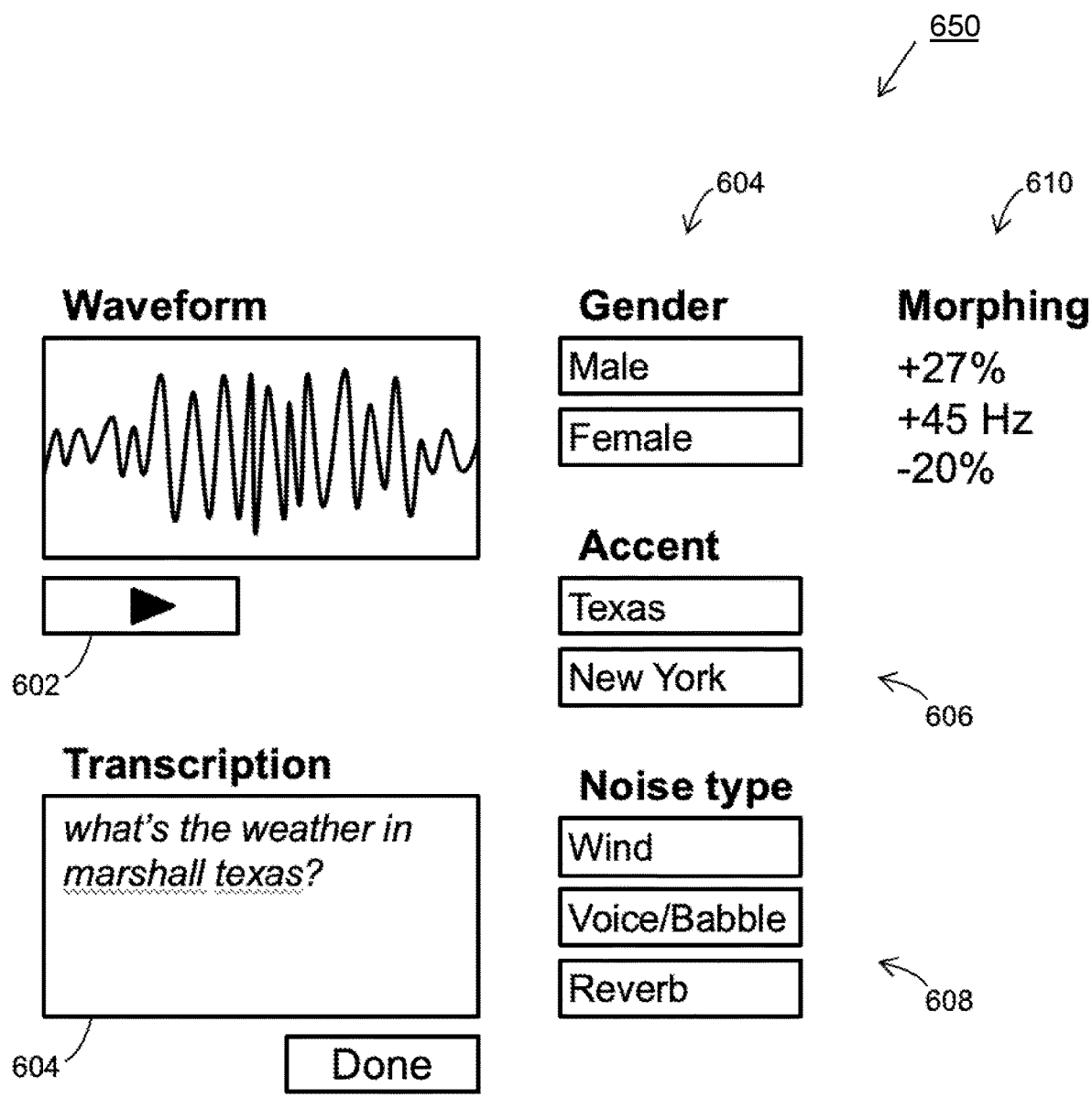
FIG. 6(b) shows an example of a UI for a highly-trusted person tool in accordance with an embodiment of the described invention.

Server 102 is coupled to browsers 104 via any appropriate networks and distributes the stored audio clips to a highly-trusted person tool 108 in a first browser 104. Highly-trusted person tool 108 is software running in the browser that allows highly-trusted persons to inspect the audio clips in their non-morphed form. FIG. 6(*b*), which is discussed below, shows an example of a UI for highly-trusted person tool 108. In another embodiment, highly-trusted person tool 108 is embodied as a standalone software instead of executing in a browser.

Server 102 further distributes the audio clips to a data annotator tool 112 in a browser 104'. Browsers 104 and 104' may be the same type of browser. Some embodiments contain more than one data annotator tool 112 since multiple data annotators are working at once. The data annotator tool is used, for example, by contractors working remotely to transcribe and/or check the transcription of audio clips. In this embodiment, data annotator tool 112 is software running in browser 104' that allows contractors to inspect and transcribe the audio clips (and/or to confirm machine transcription of the audio clips). FIG. 6(*a*), which is discussed below, shows an example of a UI for data annotator tool 112. In another embodiment, data annotator tool 112 is embodied as a standalone software instead of executing in a browser.

Figure 1B:
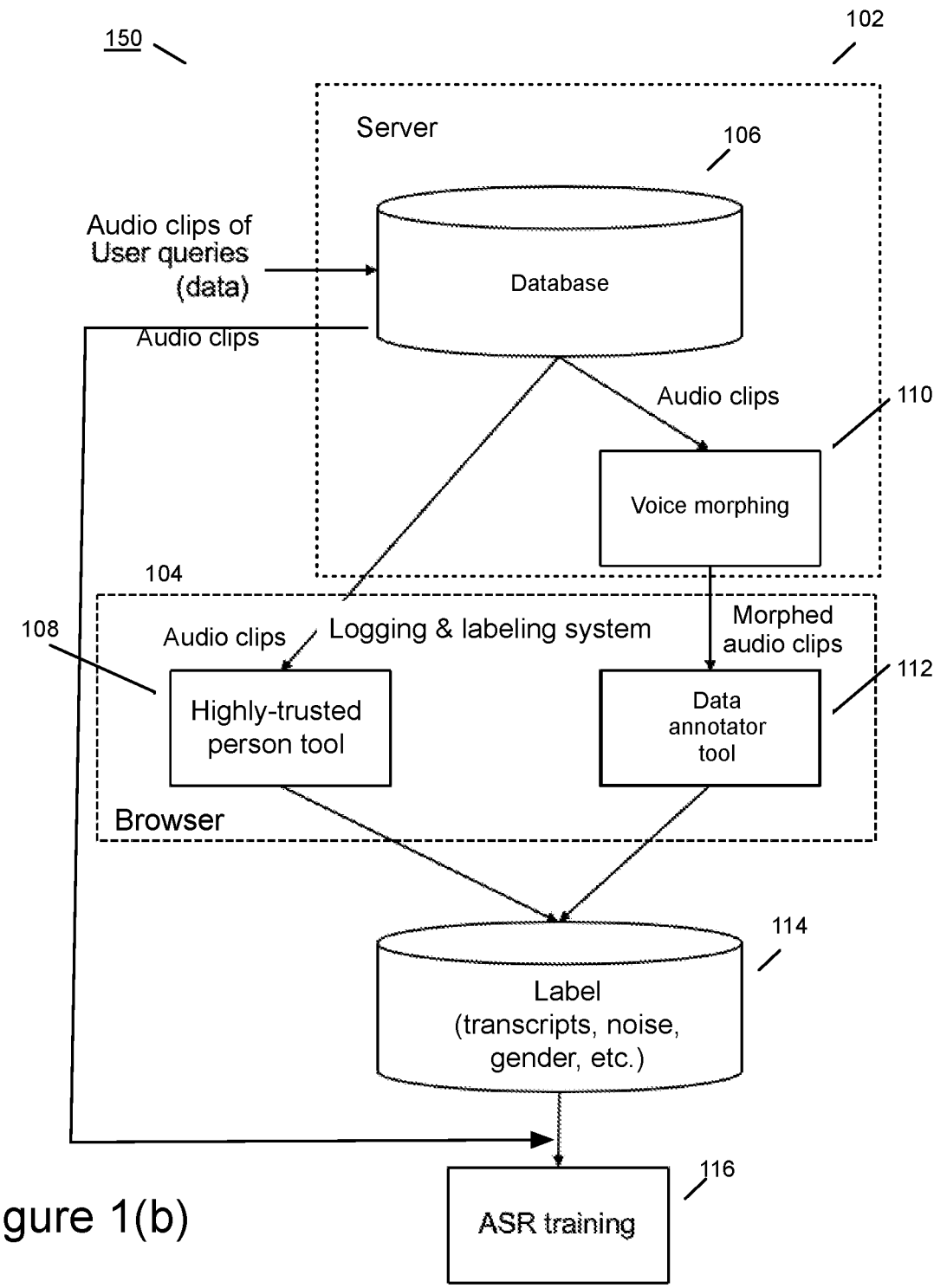
FIG. 1(b) is a block diagram showing another system in which an embodiment of the described invention is used.
Figure 1C:
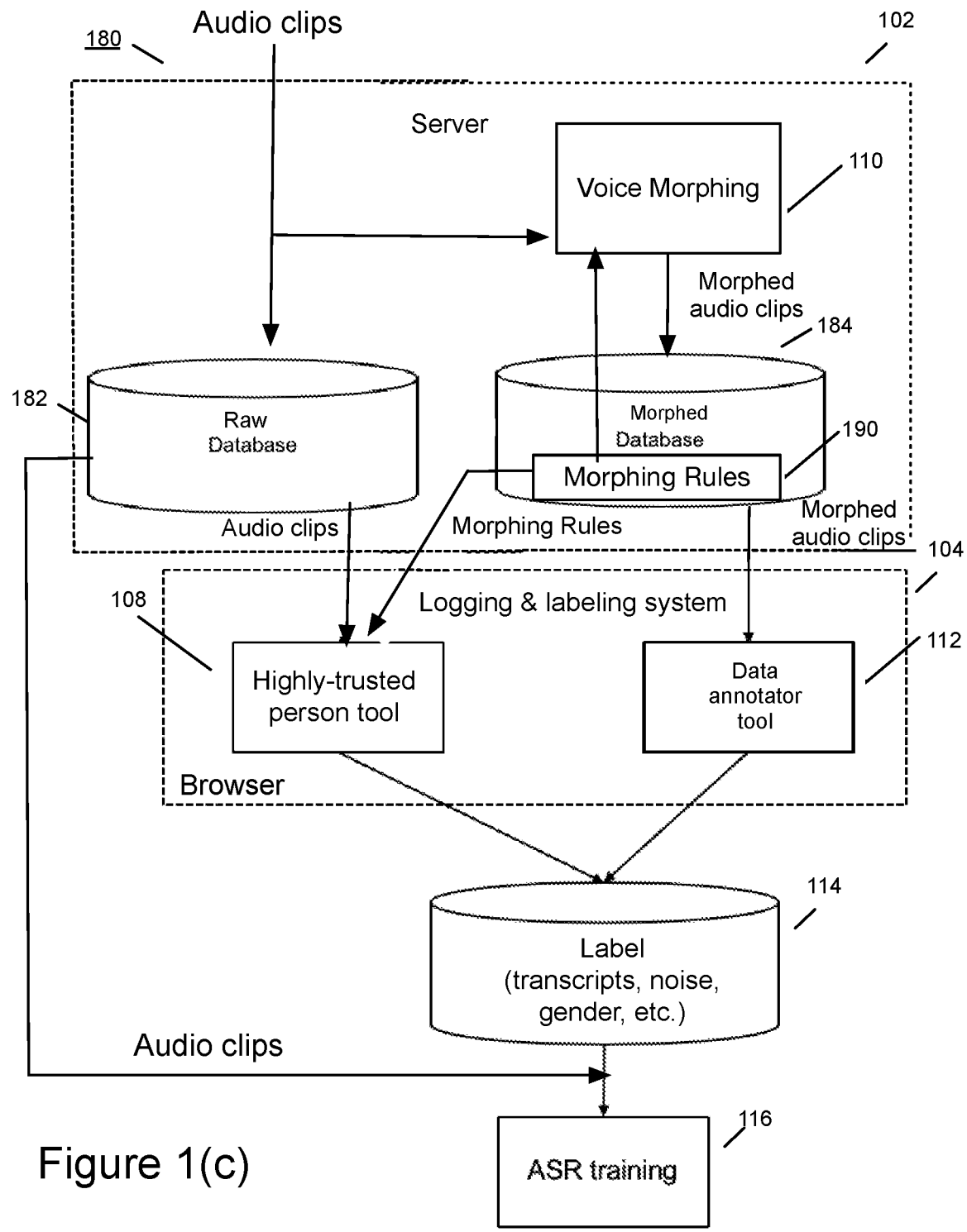
FIG. 1(c) is a block diagram showing another system in which an embodiment of the described invention is used.

In the embodiment of FIG. 1(*a*), the audio clips are processed by a voice morpher 110 before being input to data annotator tool 112. In this embodiment, the voice morpher 110 is embodied as software running on or controlled by browser 104', for example, as a part of data annotator tool 112 or as a browser script, plugin, add on, etc. This embodiment has an advantage of being simpler to implement with browser script function calls such as standard ones available for JavaScript but has a disadvantage of locating the morphing process on the browser, where either the morphing algorithm or the unmorphed data or both may possibly be more easily examined. Moreover, varieties of voice morpher 110 can vary for each of multiple browsers to enhance security. Embodiments of voice morpher 110 are discussed below in connection with FIGS. 3-5.

FIG. 1(*b*) is a block diagram showing a system 150 in which an embodiment of the described invention is used. In FIG. 1(*b*), system 150 comprises at least one server 102, at least one browser 104, a database 114 containing the outputs of the transcription process, and software 116 to perform ASR training for a neural network model using the output of the transcription process. The tools may also execute on separate browsers. In one embodiment, the original audio clip is sent for training. In this embodiment, the morphed clip is only used for labeling. In one embodiment, tools 108 and 112 make up a "logging and labeling system." In FIG. 1(*b*), audio clips of user queries and control statements are captured from, for example, a home automation device, query device, car automation device, dictation system, etc. This data is stored in a database 106 of server 102. In some embodiments, there may be more than one server 102 and the data may be stored across multiple servers.

Server 102 distributes the audio clips to a highly-trusted person tool 108 in at least one browser 104. Highly-trusted person tool 108 is software running in the browser that allows highly-trusted persons to inspect the unmorphed audio clips. FIG. 6(*b*), which is discussed below, shows an example of a UI for highly-trusted person tool 108. In another embodiment, highly-trusted person tool 108 is embodied as a standalone software instead of executing in a browser.

Server 102 further distributes the audio clips to a data annotator tool 112 in at least one browser 104. The data annotator tool is used, for example, by contractors working remotely to transcribe audio clips. Some embodiments contain more than one data annotator tool 112 since multiple data annotators are working at once. In one embodiment, data annotator tool 112 is software running in the browser that allows contractors to inspect and transcribe the audio clips (and/or to confirm machine transcription of the audio clips). FIG. 6(*a*), which is discussed below, shows an example of a UI for data annotator tool 112. In another embodiment, data annotator tool 112 is embodied as standalone software instead of executing in a browser. Yet another embodiment includes data annotator tool 112 and not highly-trusted person tool 108.

In the embodiment of FIG. 1(*b*), the audio clips are processed by a voice morpher 110 before being input to data annotator tool 112. In this embodiment, the voice morpher 110 is software running on or controlled by server 102. In one embodiment, a voice clip is morphed before it is sent to a particular annotator tool 112. In another embodiment, a voice clip is morphed once when it is received at the server and stored until it is sent for transcription. These embodiments have the advantage of maintaining control over the voice morphing process at the server and do not allow the unmorphed clip to be exposed during travel over a network to data annotator tool 112. Embodiments of voice morpher 110 are discussed below in connection with FIGS. 3-5.

FIG. 1(*c*) is a block diagram showing another system in which an embodiment of the described invention is used. In FIG. 1(*c*), system 180 comprises at least one server 102, at least one browser 104, a database 114 containing the outputs of the transcription process, and software 116 to perform ASR training for a neural network model using the output of the transcription process. The tools may also execute on separate browsers. In one embodiment, the original audio clip is sent for training. In this embodiment, the morphed clip is only used for labeling. In one embodiment, tools 108 and 112 make up a "logging and labeling system." In FIG. 1(*c*), audio clips of user queries and control statements are captured from, for example, a home automation device, query device, car automation device, dictation system, etc. This data is stored in a raw database 182 of server 102. In some embodiments, there may be more than one server 102 and the data may be stored across multiple servers.

Server 102 distributes the audio clips to a highly-trusted person tool 108 in at least one browser 104. Highly-trusted person tool 108 is software running in the browser that allows highly-trusted persons to inspect the unmorphed audio clips and further to inspect the morphing rules as discussed below. FIG. 6(*b*), which is discussed below, shows an example of a UI for highly-trusted person tool 108. In another embodiment, highly-trusted person tool 108 is embodied as a standalone software instead of executing in a browser.

In the embodiment of FIG. 1(*c*), audio clips are also morphed by voice morpher 110 to yield morphed audio clips, as described below, and stored in a morphed database 184.

Server 102 further distributes the morphed audio clips from morphed database 184 to a data annotator tool 112 in at least one browser 104. The data annotator tool is used, for example, by contractors working remotely to transcribe audio clips. Some embodiments contain more than one data annotator tool 112 since multiple data annotators are working at once. In one embodiment, data annotator tool 112 is software running in the browser that allows contractors to inspect and transcribe the audio clips (and/or to confirm machine transcription of the audio clips). FIG. 6(*a*), which is discussed below, shows an example of a UI for data annotator tool 112. In another embodiment, data annotator tool 112 is embodied as standalone software instead of executing in a browser. Yet another embodiment includes data annotator tool 112 and not highly-trusted person tool 108.

Morphed database also includes an indication of the specific morphing rules (parameter sets) 190 used for morphing each audio clip. In one embodiment, the morphing rules can be shown to the Highly-trusted person tool 108 for inspection. In one embodiment, morphing database 184 further stores a reproducible morph specific to each audio clip so that the Highly-trusted person can hear exactly what the labeler heard. Reproducible morph rules are computed, for example, by a hashing algorithm run on data from the audio clip. Some embodiments additionally use a second, third, etc. hashing algorithm to make further reproducible morphs for each audio clip. This is useful if, for example, audio clips will be sent to annotators for reviews and cross-checks to ensure accuracy.

Figure 2:
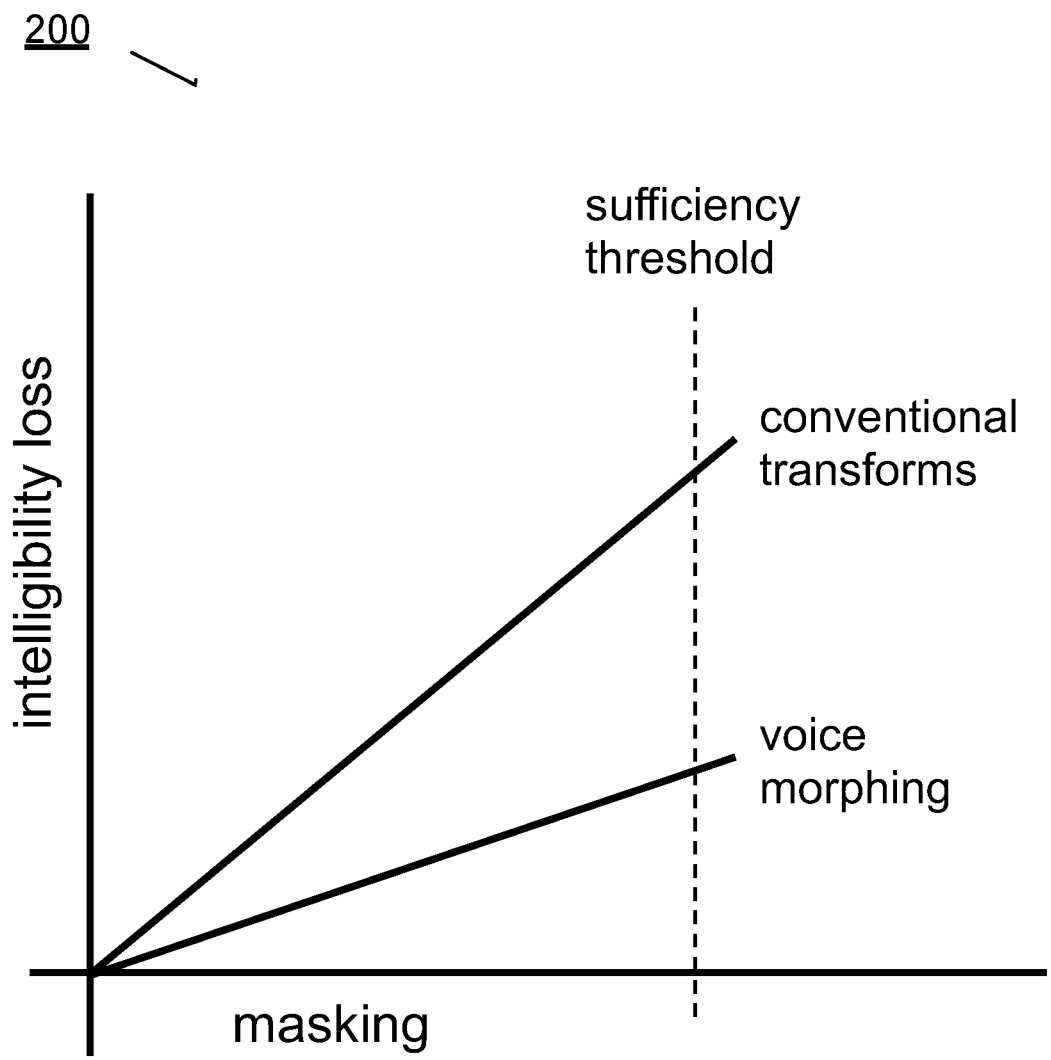
FIG. 2 is a diagram showing an advantage of the described invention.

FIG. 2 is a diagram showing an advantage of the described invention. The chart of FIG. 2 is included to demonstrate a concept and not to reflect actual measurements. Implementations of the invention allow morphing to a degree sufficient to reliably de-identify voices (aka "masking") while creating much less loss of intelligibility than conventional voice transforms.

Intelligibility of speech is a measure of the ease of discriminating phonemes. Any form of voice morphing loses information. As a result, there is always some loss of intelligibility as a function of the effectiveness of voice identity masking. However, embodiments of the present invention provide a better trade-off.

Voice masking is changing the voice of an audio clip to make the speaker's voice less recognizable. What amount of each parameter of morphing rules is sufficient to mask a voice will be different for each voice (its distinctness), each recording of the voice (due to noise or distortions), and the listener (skill at identifying speakers). As shown in FIG. 2, conventional transforms result in increased intelligibility loss (and thus lower intelligibility) as masking of an audio clip increases past a sufficiency threshold beyond which, with reasonable probability, speaker's voices are de-identified. In contrast, voice morphing in accordance with the described invention results in less loss of intelligibility, even as the voice masking increases.

Figure 3:
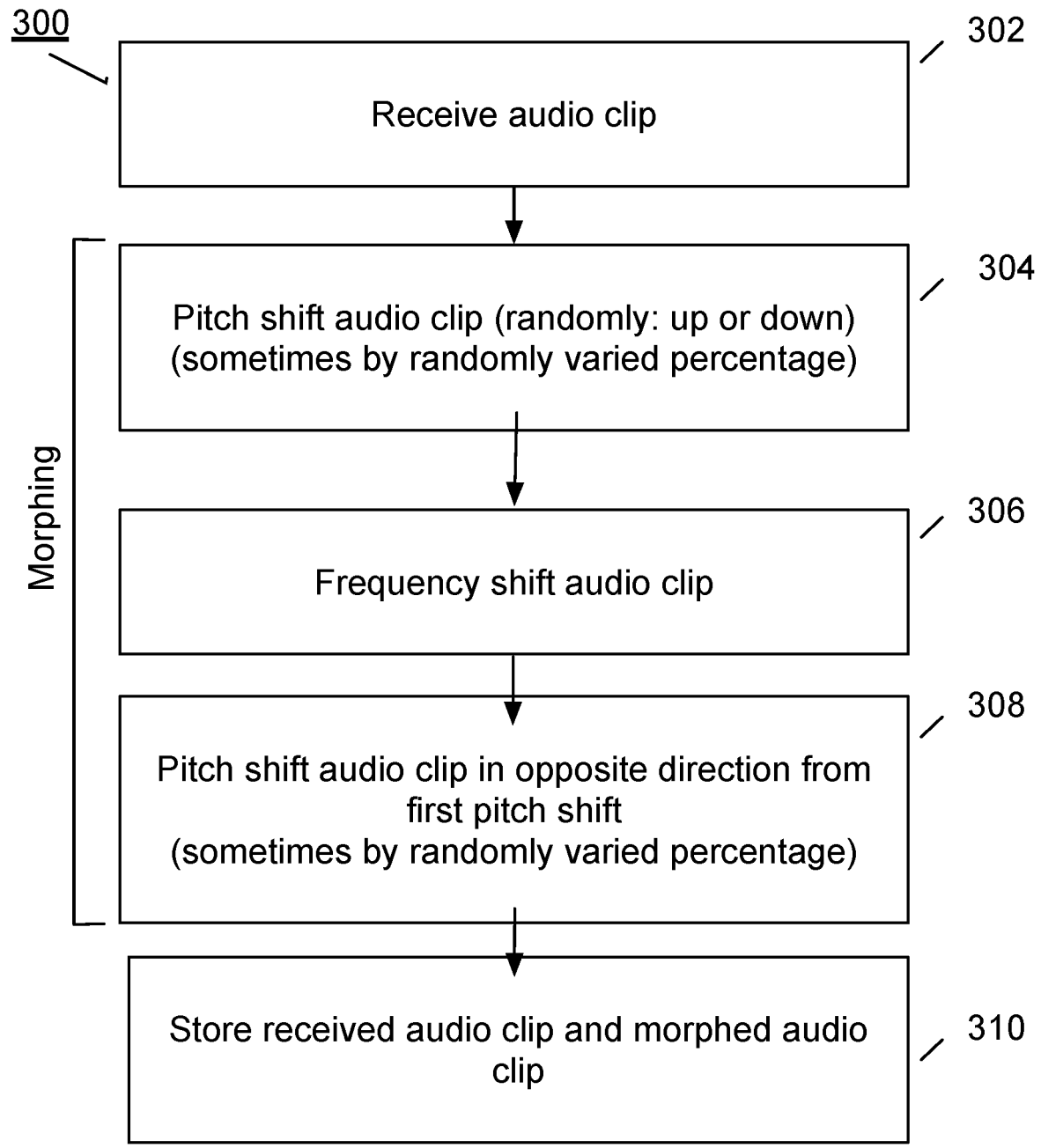
FIG. 3 is a flowchart of an embodiment of a morphing method used in the described invention.

FIG. 3 is a flowchart 300 of an embodiment of a morphing method that can be performed by voice morpher 110. Voice morpher 110 receives 302 an audio clip that has been recorded from a device or process where users use their voice for control or query purposes, such as a home controller, voice-based query system, car control system, dictation system, etc. This audio clip is then morphed in a manner that de-identifies the speaker but maintains a good degree of intelligibility for the clip.

An embodiment of the morphing process is performed in elements 304, 306, and 308 of the flowchart. In element 304, the audio clip is pitch shifted either up or down by an amount determined as described below.

In general, a first pitch shift is followed by a frequency shift, which is followed by a second pitch shift in a direction opposite that of the first pitch shift. Pitch shifting is effectively the same as making the playback speed different from the recording speed in an analog process, or resampling at a different sample rate in a digital process. In the frequency domain, this is a multiplicative scaling. This was a great novelty in the 1950s with radio and television shows such as Alvin and the Chipmunks. Today it can be implemented, for example, as a JavaScript function in a web browser.

In one embodiment, a Fourier transform is done before frequency shift, converting audio data into the frequency-amplitude domain, where it can be transformed easily by changing frequency components such as by concatenating values at the low frequency ends of the frequency domain representation of the signal. An inverse Fourier transform follows the frequency shift, returning the morphed audio data to the time-amplitude domain.

In one embodiment, whether a clip is first pitch shifted up or down is randomly determined by voice morpher 110. Thus, roughly half the time, the first pitch shift is up and half the time the first pitch shift is down. In one embodiment, the pitch shift is between 15 and 200% in the up or down directions, although other embodiments may use slightly different ranges. In one embodiment, the percentage of the first pitch shift is varied randomly within a range, such as a range of 15-200%. Randomly varying the percentage of the first pitch shift (in addition to shifting either up or down) allows the morphed data even more variance from the original audio clip and makes it harder for a human being to infer that multiple audio clips of the same speaker are from the same person. In one embodiment, the first pitch shift is a predetermined value and the second pitch shift is a second predetermined value from the range of 15-200%.

Figure 4A:
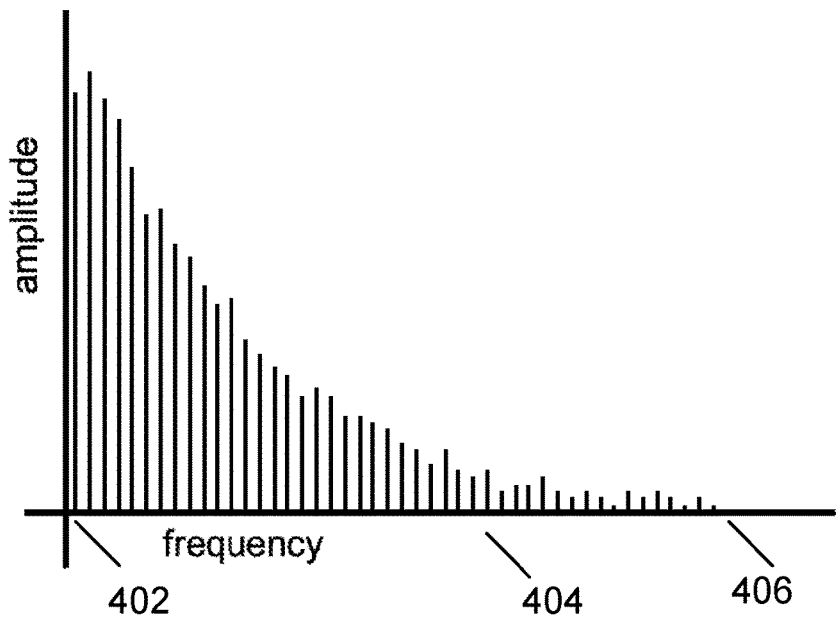
FIGS. 4(a) and 4(b) show an example of pitch shifting up.
Figure 4B:
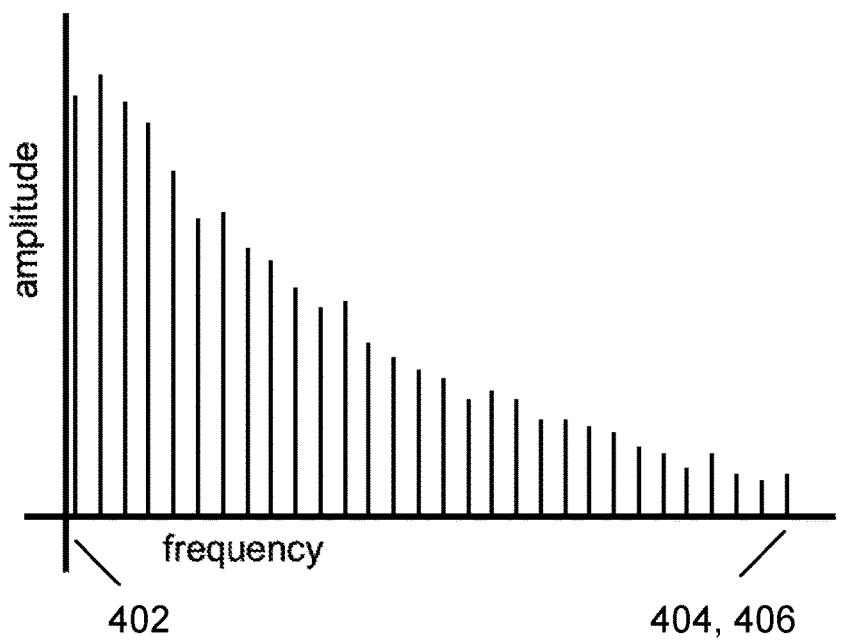

FIGS. 4(*a*) and 4(*b*) show an example of pitch shifting up. In FIG. 4(*a*), the Y axis represents amplitude and the X axis represents frequency for an audio clip. For the original clip, the frequency runs from frequency 402 to a maximum frequency represented by output of the Fourier transform (reference numeral 406). Reference numeral 404 represents a frequency lower than that of reference numeral 406.

FIG. 4(*b*) shows the clip after it has been pitch shifted up. In FIG. 4(*b*), the frequency runs from frequency 402 to the same frequency, still represented by reference numeral 406. In this case, the graph has been "stretched" so that the spectral line previously indicated by reference number 404 is now at the frequency represented by reference numeral 406. Because the range of frequencies represented in the frequency domain data is fixed, this cuts off some of the spectral information at the high frequency end of the unshifted clip.

FIGS. 4(*c*) and 4(*d*) show an example of pitch shifting down. In FIG. 4(*c*), the Y axis represents amplitude and the X axis represents frequency for an audio clip. For the original clip, the frequency runs from frequency 402 to a maximum frequency represented by the output of the Fourier transform (reference numeral 406). Reference numeral 408 represents a frequency higher than that of reference numeral 406.

FIG. 4(*d*) shows the clip after it has been pitch shifted down. In FIG. 4(*d*), the frequency runs from frequency 402 to the same frequency, still represented by reference numeral 406. In this case, the graph has been "squashed" horizontally so that the part of the graph previously indicated by reference number 406 is now at the frequency represented by reference numeral 408. In FIG. 3, element 306, the audio clip is frequency shifted up by an amount determined as described below. Frequency shifting tends to yield a "robotic" sound to an audio clip. In one embodiment, the frequency shift is between 100 and 280 Hz, selected randomly for each morph, although other embodiments may use slightly different ranges. Randomizing the shift amount for each run of the morpher 110 has the benefit of making it almost impossible to reverse the morphing for any given audio clip.

In another embodiment, the degree of frequency shift is a frequency in the range of 100 to 280 and is fixed for each run of the morpher 110. In another embodiment, the degree of frequency shift is a frequency in the range of 100 to 280 and is fixed for all runs of the morpher 110. Although the embodiment described above performs a frequency shift up, other embodiments perform a frequency shift down (or randomly choose to shift up or down).

FIGS. 5(*a*) and 5(*b*) show an example of frequency shifting. In this embodiment, the frequency spectrum is shifted up. Frequency shifts down are feasible, but they invariably result in loss of critical acoustical information. In FIG. 5(*a*), the Y axis represents amplitude and the X axis represents frequency. For an unshifted clip, the frequency runs from a frequency represented by reference numeral 502 to a frequency represented by reference numeral 506. Reference numeral 504 represents a frequency higher than that of reference 502 by a set amount and reference number 508 represents a frequency higher than that of reference numeral 506 by the same set amount.

FIG. 5(*b*) shows the clip after it has been frequency shifted up. In FIG. 5(*b*) the frequency runs from frequency 504 to the frequency 508. Thus, the spectral lines are shifted right by the set amount that is the difference between 502, 504 and 506, 508. The example shown in FIG. 5(*a*) and FIG. 5(*b*) shows the concatenation of zero-value frequency components at the low end of the frequency spectrum and truncation of frequencies at the high end. It is also possible to concatenate values that are non-zero.

In FIG. 3, element 308, the audio clip is pitch shifted either up or down a second time in a direction opposite from the first pitch shift of element 304. Thus, in one embodiment, if the first pitch shift is up, the second pitch shift is down and vice versa. Thus, again, roughly half the time, the second pitch shift is up and half the time the second pitch shift is down. In one embodiment, the percentage of each pitch shift could be any amount; but in one embodiment, the percentage of the second pitch shift is the inverse of the percentage of the first pitch shift. Thus, for example, if the first pitch shift is up by 50%, the second pitch shift is down by 33%, which will yield approximately the same frequency range as the first pitch shift. In one embodiment, the percentage of the second pitch shift is the same in both directions. Thus, for example, an up shift of 20% is followed by a down shift of 20% yielding a pitch at 96% of (4% lower than) the original pitch (since 80% of 120% is 96%).

In one embodiment, the amount of the second pitch shift is adjusted randomly so that it is not exactly the inverse of the first pitch shift. In one embodiment, the second pitch shift is randomized no more than 10% of the pitch shift that would bring the frequency back to the original. This randomization aids in de-identifying multiple voice clips of a speaker.

In one embodiment, different data annotator tools 112 are sent clips that have been subjected to different morphs. For example, the amount of the first pitch shift may vary and/or the amount of the frequency shift may vary for different clips and/or for clips sent to different tools. This means that audio clips of a speaker are more likely to receive different morphs. Randomly shifting the pitch up or down as described above results in clips for the same speaker that sound less like they are from the same speaker. Moreover, randomly changing the percentage of pitch shift and amount of frequency shift results in clips for the same speaker that sound even less like they are from the same speaker.

In addition to recognizing a speaker's voice, data annotators may use semantic information such as names and addresses to identify a speaker. Data annotators may also recognize accents, word choice, cadence, etc. that are indicative of a particular speaker. In one embodiment, clips from a same speaker are not sent to a same data annotator close to each other in time. This makes it harder for a data annotator to determine that two clips are from the same speaker and to use those clips to infer information about the speaker and to tie various utterances by a same speaker together. In yet another embodiment, clips from a same speaker are sent to different data annotators for the same reason. In yet another embodiment, clips from a same speaker are sent to different data annotators if they are being sent within a predetermined time period. For example, no clips from a same speaker are sent to the same data annotator within an hour time period. As another example, no clips from the same speaker are sent to the same data annotator unless that data annotator has seen a predetermined number of clips from other speakers in the interim. In yet another embodiment, the captured voice clips are normalized for volume so that volume cannot be used as a clue to the speaker's identify.

In yet another embodiment, tool 108 and/or tool 112 utilize a permission level that looks at an identity or login of a human user and determines whether unmorphed data should be available to the human user. This permission level adds another level of security so that only appropriate users can hear unmorphed clips. For example, highly-trusted persons may have access to unmorphed audio clips, no matter which tool they are using. As another example, certain trusted data annotators may have access to unmorphed audio clips within tool 112.

FIG. 6(*a*) shows an example of a UI 600 on a display device for data annotator tool 112 in accordance with an embodiment of the described invention. Once a morphed data clip is received by data annotator tool 112, the clip can be played by a data annotator using button 602. Assuming that the morphing process is successful, it will be more difficult for the data annotator to identify the speaker of a particular morphed clip or clips and to correlate information of multiple clips for a given speaker than it would be for the original, unmorphed audio clips. Furthermore, as discussed above, the morphing performed by embodiments of the invention morph the original speech clips without losing large amounts of intelligibility.

The data annotator enters their transcription text of the morphed audio clip into area 604. Some embodiments may allow for automatically populating the transcription entry box with an inferred correct transcription (and in some embodiments, the data annotator checks this inferred correct transcription). Area 607 allows the data annotator to select from one or more possible speaker genders (although morphing may distort some gender clues). Area 606 allows the data annotator to select from one or more types of speaker accents. Area 608 allows the data annotator to select from one or more possible types of noise in the audio clip. Various other aspects of the audio clips may be useful for data labeling to assist training ASR models. Each selection or entry of the data annotator is saved, for example, in database 114, in connection with the original audio clip and used, for example, for training data in an ASR system such as ASR training system 116. Database 114 may also store information on the morph used by the data annotator in order to gain information about the intelligibility of various morphs.

FIG. 6(*b*) shows an example of a UI 650 on a display device for highly-trusted person tool 108 in accordance with an embodiment of the described invention. In one embodiment, highly-trusted person tool 108 receives unmorphed clips from server 102. In FIG. 6(*b*), UI 650 contains approximately the same elements as the example UI 600 for data annotator tool 112 and further comprises area 610. Area 610 allows the user/highly-trusted person to observe the parameters of morphing rules specific to the audio clip. A highly trusted person might want to use this to inspect the morphs or determine whether the morph has good intelligibility. In one embodiment, the shift percentage of the second pitch shift is randomized by as much as 10% from the opposite shift, as described above.

The described morphing method can also be used in a hardware voice morphing device, so that different utterances and/or different sentences or different time periods sound different, making use of the randomness factors inherent to 304, 306, and 308 of FIG. 3, making it more difficult to identify the speaker.

While embodiments have been described with respect to pitch shifting and frequency shifting, these are just some possible parameters of voice morphing rules. Various embodiments may include morph rules with other morphing parameters.

Although the term "data annotators" is used herein, it will be understood that the "annotator" could also be a human, software, hardware, or other entity or system capable of annotating, transcribing, etc. an audio clip. The term "annotation" and "annotator" used herein is used for convenience. The various embodiments of the invention can also be used in transcription systems, etc. in which annotators receive audio clips of speech and in which it is desirable to de-identify or mask the identity of a speaker.

Figure 7:
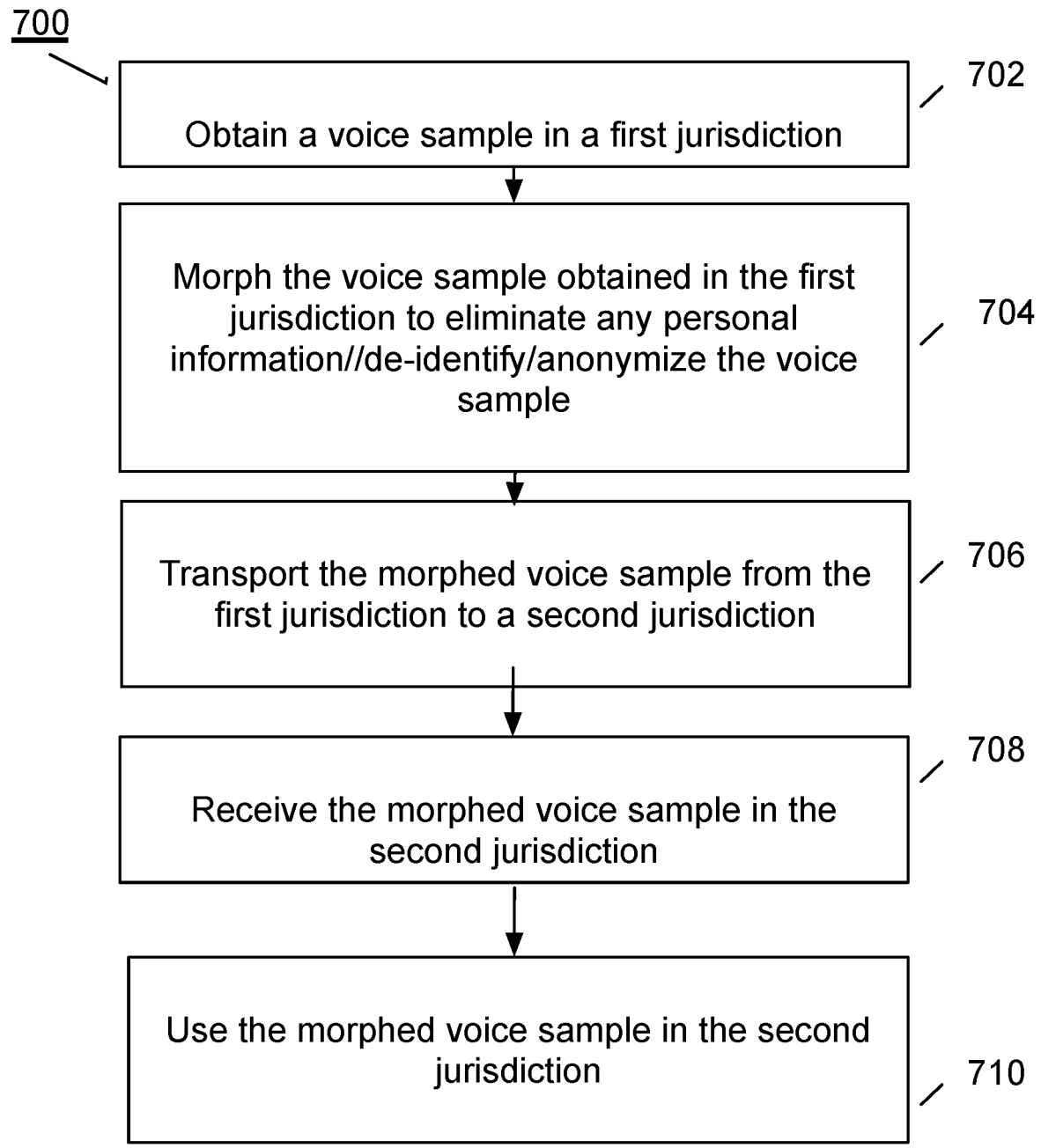
FIG. 7 is a flowchart showing one embodiment of the invention.

FIG. 7 is a flowchart 700 showing an embodiment of a method in accordance with the described invention. This method could be performed, for example, on the systems of FIG. 1(*a*), 1(*b*), or 1(*c*), when that elements of server 102 and/or browser 104 were in first and second jurisdictions. Here, one example of a jurisdiction is a legal jurisdiction such as a different country, a different state, etc. although other embodiments of the invention employ other types of jurisdiction such as different jurisdictions controlled by different companies or entities.

Element 702 obtains a first voice sample in a first jurisdiction. Element 704 morphs the voice sample obtained in the first jurisdiction to eliminate any personal information/de-identify/anonymize the voice sample. This morphing is done, for example, using the method of FIG. 3. Element 706 transports the morphed voice sample from the first jurisdiction to a second jurisdiction. Element 708 receives the morphed voice sample in the second jurisdiction. Element 710 uses the morphed voice sample in the second jurisdiction. Examples of using the morphed voice sample include but are not limited to: using the morphed voice sample in a labeling system, in a transcription system, in an ASR training system, in a voice anonymizer system, and in a system where it is desirable to de-identify and/or anonymize the voice sample.

Example System and Hardware

Figure 8:
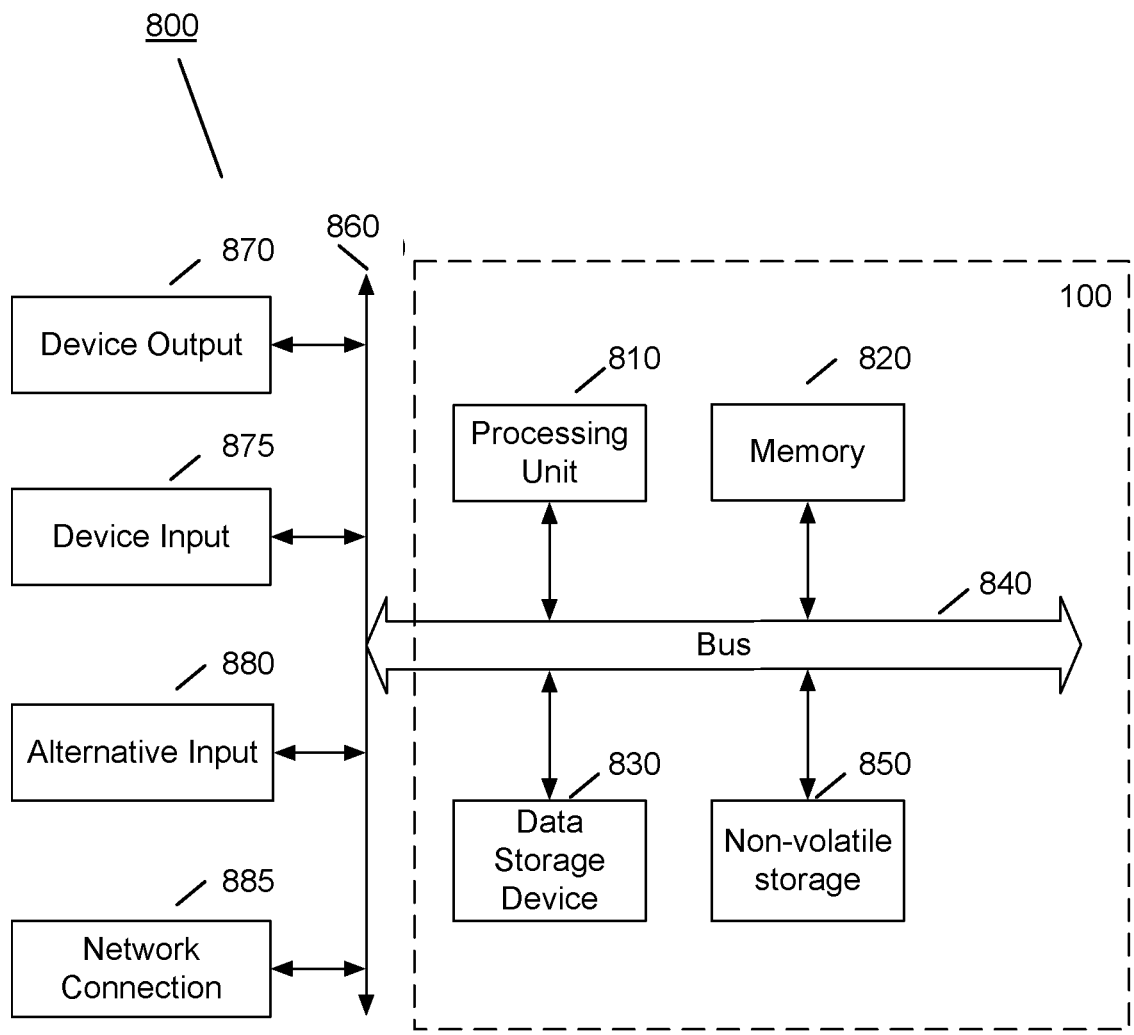
FIG. 8 is a block diagram of one embodiment of a computer system that may be used with the present invention.

FIG. 8 is a block diagram of one embodiment of a computer system that may be used with the present invention. This computer system may be, for example, server 102 or a computer system hosting one or more browsers 104. It will be apparent to those of ordinary skill in the art, however, that other alternative systems of various system architectures may also be used. The data processing system illustrated in FIG. 8 includes a bus or other internal communication means 840 for communicating information, and a processing unit 810 coupled to the bus 840 for processing information. The processing unit 810 may be a central processing unit (CPU), a digital signal processor (DSP), quantum processor, or another type of processing unit 810.

The system further includes, in one embodiment, a random access memory (RAM) or other volatile storage device 820 (referred to as memory), coupled to bus 840 for storing information and instructions to be executed by processor 810. Main memory 820 may also be used for storing temporary variables or other intermediate information during execution of instructions by processing unit 810.

The system also comprises in one embodiment a read only memory (ROM, non-volatile storage) 850 coupled to bus 840 for storing static information and instructions for processor 810. In one embodiment, the system also includes a data storage device 830 such as a magnetic disk or optical disk and its corresponding disk drive, or flash memory or other storage which is capable of storing data when no power is supplied to the system. Data storage device 830 in one embodiment is coupled to bus 840 for storing information and instructions.

The system may further be coupled to an output device 870, such as a flat screen display or other display coupled to bus 840 through bus 860 for outputting information. The output device 870 may be a visual output device, an audio output device, and/or tactile output device (e.g. vibrations, etc.)

An input device 875 may be coupled to the bus 860. The input device 875 may be an alphanumeric input device, such as a keyboard including alphanumeric and other keys, for enabling a user to communicate information and command selections to processing unit 810. An additional user input device 880 may further be included. One such user input device 880 is cursor control device 880, such as a mouse, a trackball, stylus, cursor direction keys, or touch screen, may be coupled to bus 840 through bus 860 for communicating direction information and command selections to processing unit 810, and for controlling movement on display device 870.

Another device, which may optionally be coupled to computer system 800, is a network device 885 for accessing other nodes of a distributed system via a network. The communication device 885 may include any of a number of commercially available networking peripheral devices such as those used for coupling to an Ethernet, token ring, Internet, or wide area network, personal area network, wireless network or other method of accessing other devices. The communication device 885 may further be a null-modem connection or any other mechanism that provides connectivity between the computer system 800 and the outside world and to allow communication between clients and servers.

Note that any or all of the components of this system illustrated in FIG. 8 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 820, mass storage device 830, or other storage medium locally or remotely accessible to processor 810.

It will be apparent to those of ordinary skill in the art that the system, method, and process described herein can be implemented as software stored in main memory 820 or read only memory 850 and executed by processor 810. This control logic or software may also be resident on an article of manufacture comprising a computer readable medium having computer readable program code embodied therein and being readable by the mass storage device 830 and for causing the processor 810 to operate in accordance with the methods and teachings herein.

The present invention may also be embodied in a handheld or portable device containing a subset of the computer hardware components described above. For example, the handheld device may be configured to contain only the bus 840, the processor 810, and memory 850 and/or 820.

The handheld device may be configured to include a set of buttons or input signaling components with which a user may select from a set of available options. These could be considered input device #1 875 or input device #2 880. The handheld device may also be configured to include an output device 870 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 810, a data storage device 830, a bus 840, and memory 820, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen or similar mechanism. In one embodiment, the device may not provide any direct input/output signals but may be configured and accessed through a website or other network-based connection through network device 885.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 810. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

I claim:

1. A system for transcribing natural language speech, the system comprising: a computer implementing a data annotator tool that performs:
    receiving an audio clip comprising the natural language speech from a server;
    morphing the audio clip to a morphed audio clip where the audio clip is pitch shifted, frequency shifted, and pitch shifted a second time;
    playing the morphed audio clip for a human being;
    receiving a transcription input from the human being for the morphed audio clip; and
    providing the transcription input to a memory, wherein the data annotator tool further comprises:
    a first UI area that allows the human being to play the morphed audio clip;
    a second UI area that allows the human being to enter the transcription input of the morphed audio clip;
    a third UI area that allows the human being to enter a gender input for the morphed audio clip;
    a fourth UI area that allows the human being to enter an accent input for the morphed audio clip; and
    a fifth UI area that allows the human being to enter a noise input of the morphed audio clip.

2. The system of claim 1, wherein the morphing comprises:
    first pitch shifting the received audio clip;
    frequency shifting the pitch shifted speech clip; and
    pitch shifting the frequency shifted speech clip in a direction opposite to the first pitch shift.

3. The system of claim 1, wherein the data annotator tool further performs:
    receiving a gender input from the human being representing the human being's identification of a gender of a speaker in the morphed audio clip; and
    sending the gender input for the morphed audio clip to the server.

4. The system of claim 1, wherein the data annotator tool further performs:
    receiving an accent input from the human being, representing the human being's identification of an accent present in the morphed audio clip; and
    sending the accent input for the morphed audio clip to the server.

5. The system of claim 1, wherein the data annotator tool further performs:
    receiving a noise input from the human being representing the human being's identification of noise effects present in the morphed audio clip; and
    sending the noise input for the morphed audio clip to the server.

6. The system of claim 5, wherein the noise input received from the human being for the morphed audio clip comprises one or more of: wind, voice/babble, and reverb.

7. The system of claim 1, wherein the data annotator tool further performs
    displaying parameters of morphing rules specific to the morphed audio clip.

8. The system of claim 1, further comprising:
    receiving a second audio clip from the server; and
    morphing the second audio clip to a second morphed audio clip where the second audio clip is pitch shifted, frequency shifted, and pitch shifted,
    wherein the morphed audio clip and the second morphed audio clip are morphed using different morphing techniques from each other.

9. The system of claim 1, wherein the data annotator tool receives an audio clip and a second audio clip, the audio clip and the second audio clip being from the same speaker, and wherein a first morphing technique is used to create the morphed audio clip from the audio clip and a second morphing technique is used to create a second input morphed audio clip from the second audio clip.

10. A system of transcribing natural language speech, the system comprising:
a computer that performs:
receiving an audio clip comprising the natural language speech, and
morphing the audio clip to a morphed audio clip, where the audio clip is pitch shifted, frequency shifted, and pitch shifted; and
a data annotator tool that performs:
receiving the morphed audio clip,
playing the morphed audio clip for a human being,
receiving a transcription input from the human being for the morphed audio clip, and
providing the transcription input to an ASR training module for use in training a model, wherein the data annotator tool further comprises:
a first UI area that allows the human being to play the morphed audio clip;
a second UI area that allows the human being to enter the transcription input of the morphed audio clip;
a third UI area that allows the human being to enter a gender input for the morphed audio clip;
a fourth UI area that allows the human being to enter an accent input for the morphed audio clip; and
a fifth UI area that allows the human being to enter a noise input of the morphed audio clip.

11. The system of claim 10, wherein the morphing comprises:
pitch shifting the received audio clip in a first direction;
frequency shifting the pitch shifted speech clip; and
pitch shifting the frequency shifted speech clip in a second direction opposite to the first direction.

12. The system of claim 10, wherein the data annotator tool further performs:
Receiving the gender input from the human being representing the human being's identification of a gender of a speaker in the morphed audio clip; and
providing the gender input to the ASR training module for use in training the model.

13. The system of claim 10, wherein the data annotator tool further performs:
receiving the accent input from the human being, representing the human being's identification of an accent present in the morphed audio clip; and
providing the accent input to the ASR training module for use in training the model.

14. The system of claim 10, wherein the data annotator tool further performs:
receiving the noise input from the human being representing the human being's identification of noise effects present in the morphed audio clip; and
providing the noise input to the ASR training module for use in training the model.

15. The system of claim 14, wherein the noise input received from the human being for the morphed audio clip comprises one or more of: wind, voice/babble, and reverb.

16. The system of claim 10, wherein the data annotator tool further performs:
displaying parameters of morphing rules specific to the morphed audio clip.

17. A method for transcribing natural language speech, the method comprising, performed by a data annotator tool:
receiving an audio clip comprising the natural language speech from a server;
morphing the audio clip to a morphed audio clip where the audio clip is pitch shifted, frequency shifted, and pitch shifted,
playing the morphed audio clip for a human being;
receiving a transcription input from the human being for the morphed audio clip; and
providing the transcription input to a memory, wherein the data annotator tool further comprises:
a first UI area that allows the human being to play the morphed audio clip;
a second UI area that allows the human being to enter the transcription input of the morphed audio clip;
a third UI area that allows the human being to enter a gender input for the morphed audio clip;
a fourth UI area that allows the human being to enter an accent input for the morphed audio clip; and
a fifth UI area that allows the human being to enter a noise input of the morphed audio clip.

* * * * *